Sept. 28, 1937. R. K. LEE ET AL 2,094,074

CUSHION UNIT AND METHOD OF MAKING THE SAME

Filed Oct. 19, 1934 2 Sheets-Sheet 1

INVENTORS.
Roger K. Lee,
Clark A. Tea,
BY Hal C. Anderson.
Harness, Lind, Patee & Harris.
ATTORNEYS.

Sept. 28, 1937.  R. K. LEE ET AL  2,094,074
CUSHION UNIT AND METHOD OF MAKING THE SAME
Filed Oct. 19, 1934  2 Sheets-Sheet 2
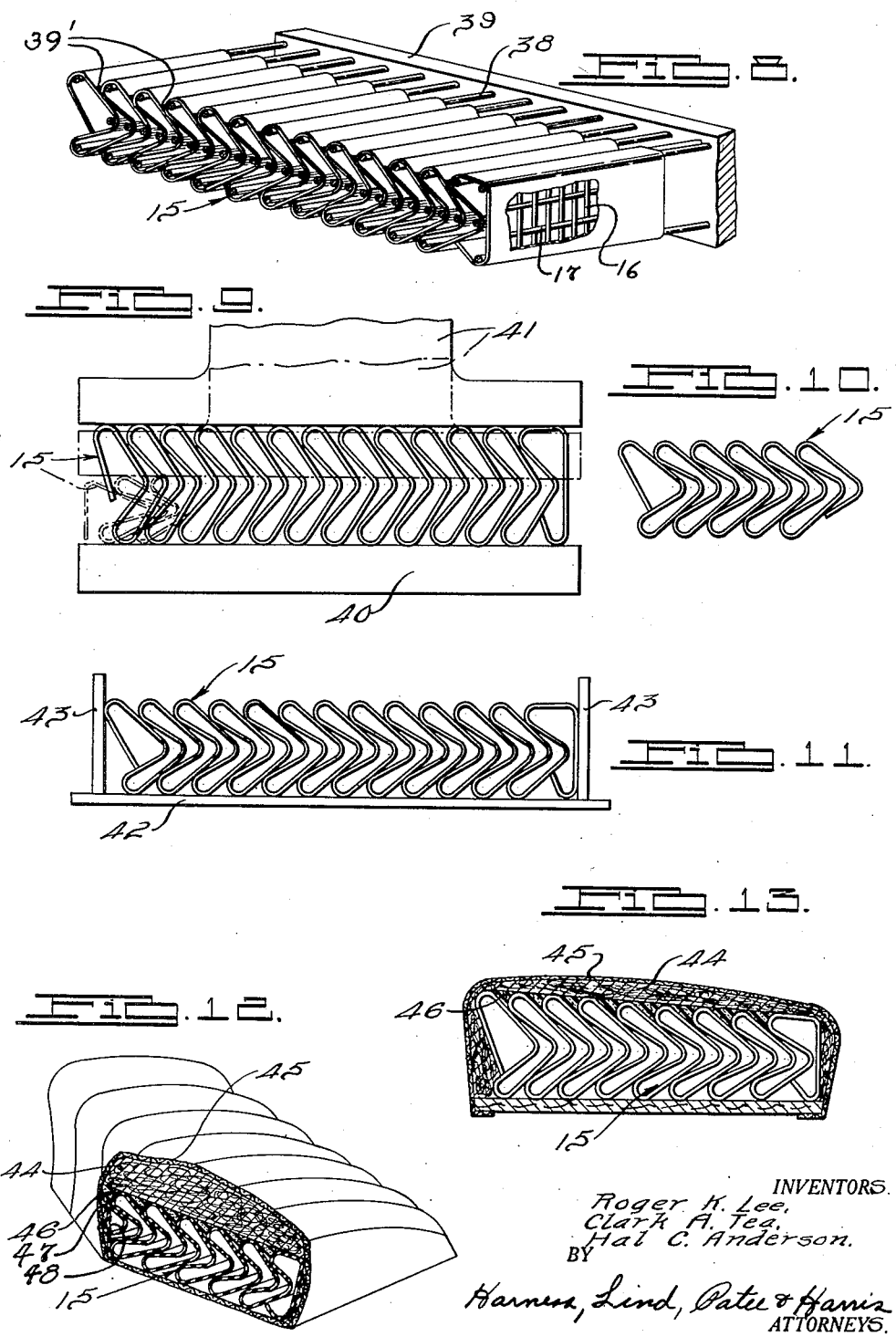

Patented Sept. 28, 1937

2,094,074

UNITED STATES PATENT OFFICE 2,094,074

CUSHION UNIT AND METHOD OF MAKING THE SAME

Roger K. Lee, Highland Park, Clark A. Tea, Detroit, and Hal C. Anderson, Highland Park, Mich., assignors to Chrysler Corporation, Detroit, Mich., a corporation of Delaware Application October 19, 1934, Serial No. 749,022

11 Claims. (Cl. 155—179)

This invention relates to an improved resilient cushion unit for vehicle seats, upholstered furniture, mattresses, and the like, and to the method of making the same, and is an improvement of the subject matter of application Serial No. 695,558.

The main objects of the invention are to provide a resilient unit of this character which gradually builds up resistance to compression throughout a substantially large initial portion of its deflection range, and which has a more rapid build-up rate throughout the remaining portion of such range; to provide a device of this kind which has substantially uniform flexibility and practically the same variable build-up characteristics throughout substantially all of its weight supporting portions; to provide a resilient cushion unit which readily conforms to the contours of the portion of the body with which it registers when in use, and which exerts a substantially evenly distributed supporting pressure thereon; to provide a device of this character which is particularly adapted to yield freely in compression throughout the initial stages of its deflection range so as to cushion the slight movements of an occupant of a vehicle seat which occur when the vehicle is driven over smooth or slightly rough road surfaces, and to yield less freely during the remaining portion of its deflection range so as to cushion the severe movements of a vehicle seat occupant when the vehicle is driven over comparatively rough roads; and to provide for damping of the rebound action of the resilient unit.

Other objects of the invention are to provide, in a resilient cushion unit of this kind, a convoluted spring member having a metal wire body portion; to provide a sound insulating and rust resisting rubber envelope for the wire body portion which conforms with the convoluted contour thereof, and which holds the wires of adjacent folds against metal to metal contact; to provide an envelope of this character which is rigidly adhered to the wire body portion; to provide a substantially secure bond between contacting portions of adjacent convolutions so as to stabilize and hold the convoluted member against collapsing and rocking; to provide a structure of this kind by which some of the resilient properties of the rubber embodied in the spring unit are utilized in yieldably supporting weight; and to provide an entirely resilient unit which has substantially less metal content per unit of weight sustaining capacity than conventional devices of this kind.

Further objects of the invention are to provide, in a spring unit, a convoluted resilient member which has adjacent series of nominally open folds disposed at opposite inclinations to a common plane and extending in opposite direction to the latter; and to provide open folds of this character which have contact with each other and which are adapted to collapse sufficiently to allow the opposite sides thereof to at least partially come together when the pressure thereon exceeds a predetermined value, so as to vary the deflection rate during further compression.

Other objects of the invention are to provide an improved sheet-like composite stock including metal wire and non-metallic resilient material from which resilient cushion units for vehicle seats, upholstered furniture, mattresses and the like, may be formed; to provide stock of this character in which the wire strands vary in their relative spaced relation so as to produce a cushion having different degrees of rigidity at selected portions thereof; to provide improved sheet-like stock of this character having wire strands of different diameters at diverse locations for selectively predetermining the rigidity of desired portions of the finished product; to provide undulated or crimped strands in a sheet-like stock of this kind which are subjected to torsional deflection during normal deflection of a cushion; and to provide stock of this kind which has a chain-link wire body portion of which portions of the individual links are diagonally disposed and so arranged in the finished product as to be subjected to torsional deflection during operation of the latter.

A still further object of the invention is to provide an improved method for forming composite rubber and wire sheet-like stock of this character; to provide a method of this kind in which a wire netting is coated with a rubber composition during a dipping operation and subsequently dried by heating and partially cured and handled in such a manner as to avoid breaking of the rubber films which are formed across the interstices of the wire netting.

Other objects of the invention are to provide an improved sheet-like stock of this character in which resilient wires are incorporated in a relatively thin film of resilient material such as rubber, the strands being independent and free from attachment together; and to provide a fibrous backing for sheet-like stock of this character which may be applied during embedding of the wires in the rubber by a calendering operation.

Still further objects of the invention are to provide an improved method of making spring units of this character; to provide a method of this kind by which sheet-like material can be economically and conveniently formed to a desired convoluted contour and fixed in such condition; and to provide a method for integrally bonding adjacent contacting convolutions of such a structure together and to an external sheathing.

Additional objects of the invention are to provide for relieving of the stresses by which the formed stock is held in convoluted condition; to provide the cushion with a permanent set by compressing it to an extent greater than that to which it is subjected in normal use so as to guard against changes of the thickness and rate of the cushion while in service; to provide a final heat treatment for the formed cushion unit by which the inherent stresses of the wire, as well as the strain to which it is subjected during the forming operation, are relieved; to provide a rubber composition which will not overcure or be otherwise injured by subjecting it to those temperatures required to relieve the strain of the wire and to increase its elastic limits and tensile strength; and to provide a composition of this character which is resilient and susceptible of a long life under repeated flexure.

Illustrative embodiments of the invention are shown in the accompanying drawings, in which:

Fig. 8 is a perspective view, partly in section, illustrating one form of apparatus and method by which the composite rubber and wire stock may be brought to a desired convoluted contour.

Fig. 9 is a side elevational view diagrammatically illustrating apparatus for and the step of providing the convoluted stock with a permanent set.

Fig. 10 is a transverse sectional view showing the stock as it appears after it has been given a permanent set.

Fig. 11 is a side elevational view of a rack for supporting the convoluted stock during a final heat treatment thereof and illustrating the manner in which the stock is supported.

Fig. 12 is a sectional view of a completed cushion embodying one of our improved resilient cushion units.

Fig. 13 is a view similar to Fig. 12 but showing a modified completed cushion unit.

Figure 1:
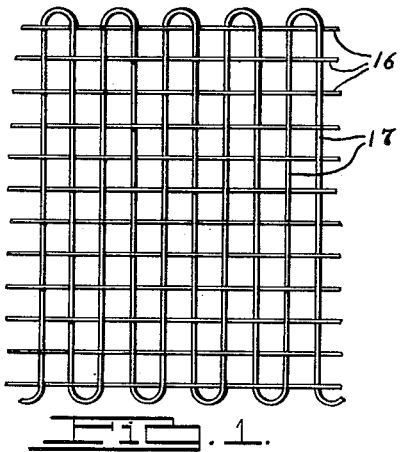
Fig. 1 is a plan view of one form of wire netting which may be advantageously employed as a resilient, reinforcing structure in a spring unit embodying the invention.
Figure 2:
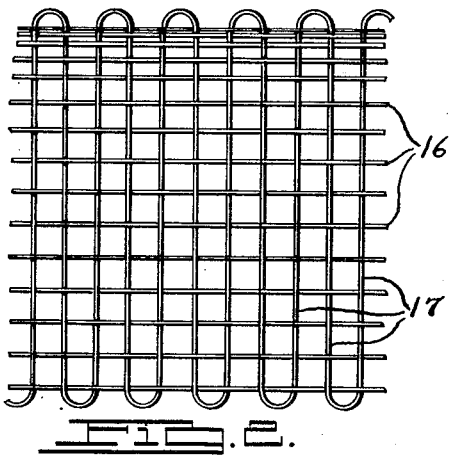
Fig. 2 is a view similar to Fig. 1, but showing a modified form of netting.

Our improved cushion unit includes a convoluted body portion, generally designated by the numeral 15, which may be formed from a large variety of different sheet-like composite stocks, some which are illustrated in Figs. 1, 2, 3, 4, 5 and 6. In each instance the stock includes either independent or netted strands of resilient wire, preferably piano wire, to which a suitable resilient non-metallic composition is applied, a rubber containing composition being preferably used for this purpose. The wire netting illustrated in Fig. 1 includes a plurality of longitudinally extending wire strands 16 which are laterally spaced substantially equal distances and held in spaced relation by transversely extending wire strands 17. The wire netting shown in Fig. 2 likewise includes longitudinal and transverse strands 16 and 17, respectively, but in this form certain of the longitudinal strands are arranged more closely together than others, thus providing for greater rigidity at selected portions of the finished product. The netting shown in Figs. 1 and 2 is of a woven type but it may be fabricated in any desired manner, the longitudinal strands preferably comprising resilient wire such as piano wire, but the transverse strands may or may not be particularly resilient. Their main function is to tie the longitudinal strands together and in some instances it is preferable to use relatively soft and malleable wire for this purpose. The transverse strands may comprise cord or any suitable fiber material where, as in most cases, they are not relied upon to add resiliency to the structure.

Figure 3:
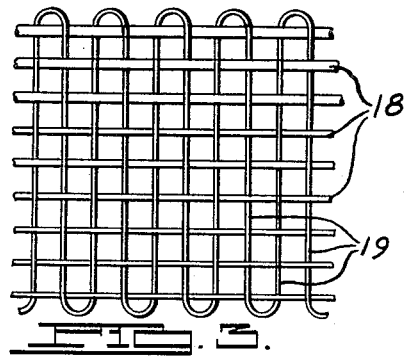
Fig. 3 is a plan view illustrating another type of wire netting which may be used.

In Fig. 3 of the drawings is illustrated another wire netting suitable for stock for the formation of resilient cushion units embodying our invention. This netting includes longitudinal strands 18 of piano, or similar wire, having different diameters, the strands of greater diameter being located in the stock in positions corresponding to the locations at which greater rigidity is required in the final product. In vehicle seats, for example, the increased rigidity would be required at the back portion of the seat proper whereas in mattresses the central portions might be strengthened to advantage. Interwoven about the successive longitudinal strands 18 are transversely extending strands 19 which may, as set forth above, comprise piano wire, relatively ductile wire or fibrous or fabric material, the transverse strands 19 serving to hold the longitudinal strands in place prior to the application of the coating material to the wire reinforcing structure.

Figure 4:
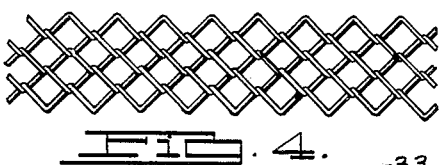
Fig. 4 is a view similar to Fig. 1 but showing a chain link netting which may also be employed in the construction of resilient cushion units embodying our invention.

The wire netting shown in Fig. 4 is of the chain link type and it may also be used as the wire reinforcing structure of the stock from which our improved resilient cushion units are formed. When stock having a body portion of this character is brought to the convoluted form, hereinafter set forth, the diagonally extending sections of the wire between successive links of the netting are so disposed as to be subjected to torsional deflection during the compression and rebound action of the cushion. The rate of the cushion is therefore a function of the torsional and bending properties of the wire strands, and since wire of this character offers substantial resistance to torsional deflection it is possible to obtain satisfactory operation of the cushion with relatively small diameter wire.

Figure 5:
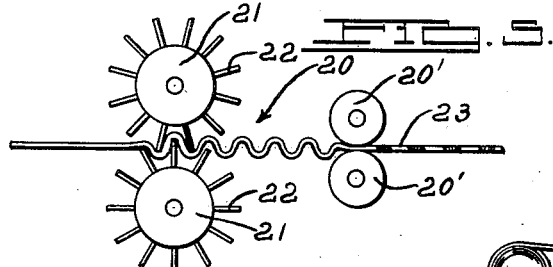
Fig. 5 is a schematic end elevational view of a crimping machine illustrating the manner in which wire netting may be modified to vary its characteristics for use in the manufacture of resilient cushion units embodying our invention.

In Fig. 5 of the drawings is illustrated wire netting throughout the strands of which are formed successive relatively small waves or undulations by passing stock of the character shown in any of the above mentioned figures through a crimpmachine generally designated by the numeral 20. Any suitable crimping apparatus may be used for this purpose, the mechanism schematically illustrated in the drawing being merely an illustration of a suitable crimping device. This apparatus includes a pair of spaced rotatably mounted rollers 21 having radially extending vanes 22 which protrude from the rollers 21 further than one-half the distance therebetween. The rollers 21 are preferably driven in timed relation by gearing or any suitable driving means. As the wire netting is passed between the rollers 21 while the latter are driven in opposite directions about their respective axes, the vanes 22 form waves or undulations 23 therein which extend upwardly and downwardly from the plane of the netting, respectively. These undulations are turned into the plane of the netting by passing the latter between rollers 20'. This waved contour brings portions of the wire into diagonal relationship with respect to the length of the finished product and as a result the same portions of the wire are deflected torsionally due to a twisting component to which they are subjected in service.

Figure 6:
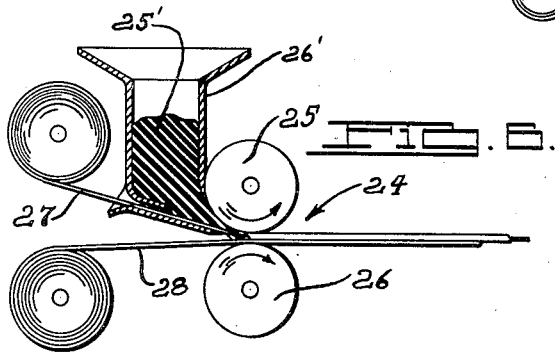
Fig. 6 is a schematic end elevational view of a calendering machine illustrating one method by which stock suitable for use in our improved resilient cushion unit may be manufactured.

Rubber or other suitable non-metallic resilient composition may be applied to any of the foregoing wire nettings to produce stock suitable for use in our improved resilient cushion unit by passing the netting through a calendering machine, generally designated by the numeral 24 in Fig. 6. This calendering machine comprises a pair of rotatably mounted rollers 25 and 26 which are so mounted as to yieldably urge their respective peripheries toward each other. The rollers 25 and 26 are driven by gearing or other suitable driving means in the directions illustrated by the arrows in Fig. 6, while the wire reinforcing material designated by the numeral 27 in this figure is fed therebetween. A resilient composition 25', such as rubber in a plastic state, is also fed between the rollers 25 and 26, from a hopper 26', and if desired a paper or other fibrous backing material 28 may be simultaneously fed between the rollers together with the wire material and resilient composition. In some instances it is unnecessary to incorporate the wire into the form of netting. This is particularly true when a backing element is employed. Separate longitudinal wire strands may be fed through between the rollers from individual rolls of wire. When separate strands of wire are employed, the resilient composition alone or the backing 28 and the composition may be relied upon to hold the strands in a predetermined spaced relation during the subsequent steps of the operation of forming the stock.

After the calendering operation, the composite sheet-like stock may be passed through a suitable curing oven and then stored for subsequent use in the formation of convoluted resilient cushion units. If it is desired to produce a direct bond between the wire and the rubber resilient composition this may be accomplished by first coating the wire with brass so as to expedite the formation of the bond during the curing treatment.

Figure 7:
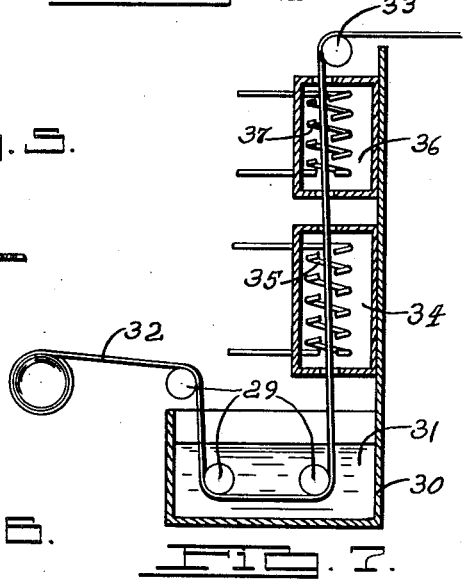
Fig. 7 is a diagrammatic illustrational view showing another process by which stock suitable for use in the manufacture of our improved resilient cushion unit may be formed.

The resilient non-metallic composition may be applied to the wire netting by the dipping operation illustrated in Fig. 7. In this case, the reinforcing structure is guided by suitably located rollers 29 through a tank 30 containing a suitable coating composition bath 31. As the wire reinforcing material, designated generally by the numeral 32 in Fig. 7, leaves the tank 30 it passes vertically upwardly therefrom a considerable distance and is then guided over a roller 33. Interposed between the tank 30 and roller 33 is a drying oven 34 which is maintained at a sufficiently high temperature by a heating element 35 to dry off any of the volatile constituents of the bath 31 which is included in the coating material carried upwardly by the wire. The solid constituent of the coating bath is deposited on the wire in a film-like layer filling substantially all or a major portion of the interstices of the netting. The drying oven 34 may be heated by electrical heating devices or by steam if desired. After the coated wire reinforcing material leaves the oven 34, it enters a second oven 36 which is also provided with a heating element 37. This oven is maintained at a somewhat higher temperature than the oven 34 for the purpose of effecting at least a partial cure of the rubber deposited on the netting. The heating element 37 may likewise comprise an electrical, steam or other suitable heating device. During the movement of the netting through the drying and curing ovens, it is preferably substantially free from contact with rollers or other guiding means which would tend to break the films produced between the wire strands or remove the coating composition.

Any suitable coating composition may be employed in the tank 30 but it is preferred to use a rubber compound having the following composition:

| | Parts by weight |
|---|---|
| Rubber (as latex) | 1000 |
| Asphalt | 1000 |
| Phenyl bata naphthylamine | 10 |
| Zinc oxide | 20 |
| Tetramethyl thiuram monosulphide | 5 |
| Sulphur | 30 |

This particular rubber composition may be used to advantage in the performance of certain of the steps, hereinafter set forth, of our improved resilient cushion unit forming method. The composition does not overcure nor is it otherwise injured by exposure to temperature within the range of 300° F. to 350° F. during a subsequent heat treatment which is applied to the resilient cushion unit after formation of the stock to a desired convoluted shape. By virtue of this property of the rubber composition, it is possible to simultaneously cure and heat treat the metallic constituent of the stock in such a manner as to relieve the inherent strain therein and the stresses created during the convoluting operation.

Any of the foregoing types of composite sheet-like stock may be brought to a convoluted contour in any desired manner so as to provide a spring unit of substantial thickness. This is preferably done by winding the stock upon suitable spaced bars 38 which are removably mounted at their respective opposite ends in side members 39 of a frame-like structure, illustrated in Fig. 8. For the purpose of illustration and in order to disclose the construction of the improved spring unit, only one side member 39 of the frame is shown in Fig. 8, the other side member being substantially identical.

Any desired arrangement of folds or convolutions may be produced by selectively varying the spacing of the bars 38. One type and arrangement of convolutions which is found to be particularly adapted for use in vehicle seat construction is illustrated in the drawings. In this instance three laterally spaced rows of longitudinally spaced bars are employed. The corresponding bars of each of the three rows are misaligned vertically as viewed in Fig. 8, so as to provide oppositely inclined convolutions or folds which extend in opposite directions from the plane containing the intermediate row of bars 38, corresponding to the common intermediate plane of both series of folds. The folds of the upper and lower series, shown in Fig. 8, overlap each other and the rounded extremity or edge portion of each fold contacts with a side of the next adjacent fold.

While the stock is held in this convoluted shape the contacting portion of the folds are cemented together as illustrated at 39' in Fig. 8. This may be accomplished with the aid of any suitable cement and in order to expedite the drying thereof the cemented convoluted structure may be placed in an oven while it is still wrapped on the bars 38. After the cement has set, the bars 38 are removed and the resulting structure is placed in a press and compressed in the manner illustrated in Fig. 9 to the dotted line position shown therein. This compression may take place between a fixed support 40 and a ram 41, or any other suitable apparatus capable of giving the strands of wire of the convolutions a permanent set in a predetermined contour. The convoluted sheet-like stock is preferably compressed during this operation to an extent greater than that to which it is subjected in normal use so as to guard against reduction in the thickness or variation in the rate of the resulting cushion in service. By giving the unit a permanent set at this stage of its manufacture all strain upon the cemented bonds between the convolutions is relieved.

After the resilient unit is removed from the press illustrated in Fig. 9, the convolutions have substantially the contour and are disposed in the relation shown in Fig. 10. The unit is then disposed in a frame 42 of the type illustrated in Fig. 11, and placed in an oven wherein it receives a final heat treatment. End members 43 on the frame 42 engage the opposite extremities of the unit and hold the latter against expansion during the heat treatment. This heat treatment consists in subjecting both the non-metallic resilient composition and the wire reinforcing structure to a temperature within the range of from substantially 300° F. to substantially 350° F. for the purpose of curing the composition and heat treating the metal wire. Exposure of the unit to temperatures in this range is particularly beneficial to piano or similar resilient wire which, during its manufacture, is placed under inherent internal stresses due to the difference in grain structure in the inner central part of the wire and the outer circumferential portions thereof. The heat treatment relieves this internal stress and also relieves any strain to which the wire has been subjected by the convolution forming operation.

It is found that a heat treatment of the above character materially increases the elastic limits of the wire and also increases its tensile strength. It is possible to heat treat the wire before the non-metallic resilient composition is applied but in that event those stresses which are subsequently developed in the wire are not relieved. By virtue of the foregoing improved rubber composition, the wire may be heat treated after all the work required has been done thereon without injuring or overcuring the rubber composition. The temperature to which the unit is subjected during the final heat treatment may vary within substantially wide limits; the upper limits of the range, however, must be below the lower limits of the annealing range of the wire.

Spring units of this character may be used, in place of the conventional coil springs in mattresses, upholstered furniture and seats which, as illustrated in Fig. 12, may be built to a desired shape and contour by applying cotton batting or other padding 44 to the top and side walls of the spring unit, and then enclosing the padding and spring unit with an external layer of upholstery material 45.

If desired the upper side of the spring unit may be brought to a substantially plain and smooth surface by filling the external grooves between adjacent convolutions with a suitable filler such as sponge rubber 46 which may be cemented in place.

A seat or cushion may also be brought to a predetermined contour by varying the size and shape of the convolutions of the resilient unit, as illustrated in Fig. 13 wherein the respective parts of the cushion structure are similar to those shown in Fig. 12 and are correspondingly designated by the same numerals. Variation of the size and shape of the convolutions may also be relied upon to bring the rate of selected portions of a cushion, mattress or the like to predetermined values.

In the operation of a spring unit of this kind, the bonds between the contacting convolutions hold the unit against rocking and collapsing. The opposite sides of the open folds or convolutions are urged together during the initial stages of compression of the unit until approaching movement of the sides of such folds is resisted or arrested. During this stage of the compression of the unit, a relatively high and constant deflection rate is provided. After the sides of the folds are held against approaching movement, the structure more rigidly resists compression, and accordingly a lower deflection rate is established. The variable deflection rate of the spring unit renders it particularly adaptable for use in vehicle seat constructions where a substantially low and constant deflection rate is required to absorb the slight shock and vibrations to which an occupant is subjected during travel of a vehicle over a comparatively smooth or slightly rough road, and where substantial rigidity is needed to oppose the severe shock and vibration which is created when the vehicle is driven over rough roads.

Secure attachment of the successive convolutions to each other assures cooperation of the convolutions in the vicinity of the location at which a load is applied in supporting such load and therefore pressure aplied to a localized portion of the seat structure is resisted by those convolutions which are located at the point of application of pressure as well as by the convolutions remote from this point.

In some instances it is desirable to close the side edges of the spring unit from which the rods 38 are withdrawn during its construction. This may be done by attaching flexible sheet material 47 of any kind to the edges of the unit, as illustrated in Fig. 12, and if material of an impervious nature is used it is possible to produce a substantially hermetic seal and to thereby entrap the air within the convolutions. Damping of the action of a hermetically sealed cushion unit of this character may be procured by providing apertures 48 in the sheeting 47 to control the ingress of air to and the egress of air from the interior of the unit.

Although but several forms of the invention are herein shown and described, various changes in the arrangement and construction of the various parts and character of the material employed, as well as in the steps of the method set forth, may be made without departing from the spirit of the invention, and it is not intended to limit its scope other than by the terms of the appended claims.

We claim:

1. In the manufacture of seats, mattresses and the like, the method of making a resilient unit which consists in forming a sheet-like element having resilient wire strands therein into successive convolutions, compressing said convolutions in the direction of their deflection under normal load to provide said wire strands with a permanent set, and thereafter relieving substantial portions of the inherent strains of said strands and the stresses created therein by said forming and compressing operations by subjecting said strands to heat treatment at a temperature below the annealing range thereof.

2. In the manufacture of seats, mattresses and the like, the method of making a resilient unit which consists in forming a sheet-like stock comprising a resilient wire reinforcing structure and a layer of rubber composition, forming said stock into successive convolutions having contacting portions, securing the contacting portions of said successive convolutions together, compressing said convolutions thereafter to provide the wire strands of said reinforcing structure with a permanent set corresponding to the desired contour of said convolutions and heat treating the resulting product to simultaneously cure said rubber composition and relieve the inherent stresses in said strands and the strains to which the latter are subjected during said convolution forming and compressing operations.

3. In the manufacture of seats, mattresses and the like, the method of making a resilient unit which consists in forming a sheet-like element having resilient wire strands therein into a series of successive folds extending on opposite sides of a plane intermediate the side planes of said series and extending at opposite inclinations to said intermediate plane respectively and bringing portions of adjacent folds into contacting relationship, securing the contacting portions of said folds together, and compressing said folds in the direction of their deflection under normal load to provide said wire strands with a permanent set corresponding to the desired contour of said folds.

4. In the manufacture of seats, mattresses and the like, the method of making a resilient unit which consists in forming a sheet-like element having resilient wire strands therein into a series of successive folds extending on opposite sides of a plane intermediate the side planes of said series and extending at opposite inclinations to said intermediate plane respectively and bringing portions of adjacent folds into contacting relationship, securing the contacting portions of said folds together, compressing said folds in the direction of their deflection under normal load to provide said wire strands with a permanent set corresponding to the desired contour of said folds, and heat treating the resulting product to relieve said wire strands of internal strains and stresses.

5. In the manufacture of seats, mattresses and the like, the method of making a resilient unit which consists in forming a sheet-like stock comprising a resilient wire reinforcing structure and a layer of rubber composition, forming said stock into a series of successive folds extending on opposite sides of a plane intermediate the opposite side planes of said series and extending at opposite inclinations to said intermediate plane respectively and bringing portions of adjacent folds into contacting relationship, securing the rubber composition of the contacting portions of said folds together, compressing said series of folds in the direction of their normal deflection under load to an extent greater than the deflection to which they are subjected in normal use so as to provide the wire strands of said reinforcing structure with a permanent set, and heat treating the resulting unit to relieve the internal strains and stresses of the wire strands of said reinforcing structure and to simultaneously cure said rubber composition.

6. A resilient unit for seats, mattresses, and the like including a convoluted sheet-like element having a plurality of strands of resilient wire extending longitudinally thereof throughout successive convolutions, the wire strands of a longitudinally extending selected portion of said element being arranged in closer relationship with respect to each other than the strands of a laterally adjacent longitudinally extending portion thereof so as to bring the rigidity of selected laterally adjacent and longitudinally extending portions of said unit to different values.

7. A resilient unit for seats, mattresses and the like including a convoluted sheet-like element having a plurality of strands of resilient wire extending longitudinally thereof throughout successive convolutions, the wire strands of a longitudinally extending selected portion of said element having a larger diameter than the strands of a laterally adjacent longitudinally extending portion thereof so as to bring the rigidity and rates of selected longitudinally extending and laterally adjacent portions of said unit to different predetermined values.

8. A resilient unit for seats, mattresses, and the like, including a convoluted sheet-like body part comprising spaced wire strands substantially enveloped in rubber and connected together by rubber webbing and having undulations disposed substantially in the plane of said body part and formed about axes substantially normal thereto and adapted to deflect torsionally under the application of normal load on said unit, said body part comprising a plurality of nested convolutions and having successive loops extending on opposite sides of a plane intermediate the side planes of said unit and extending at opposite inclinations to said intermediate plane respectively, portions of the sides of the adjacent loops on each side of said intermediate plane respectively being in contacting relationship.

9. A resilient unit for seats, mattresses, and the like, including a convoluted sheet-like fabric having resilient wire strands provided with undulations disposed substantially in the plane of said fabric and formed about axes extending substantially normal to the planes of said fabric, the opposite side walls of respective, successive convolutions extending in opposite directions from and at opposite inclinations with respect to a plane intermediate the opposite side planes of said unit.

10. The method of making a cushion unit which comprises yieldably securing the strands of a sheet-like fabric having resilient wire strands against relative displacement and providing a friction surface thereon to facilitate handling of said fabric by immersing the latter in a solution of rubber composition, partially setting said rubber conmposition on said fabric, bringing said fabric to convoluted contour by reversely bending successively adjacent portions thereof in respectively opposite directions and contacting the rubber composition deposited on adjacent resulting convolutions, and bringing the rubber composition to a substantially set state while said convolutions are engaged together by vulcanizing said composition.

11. The method of making a cushion unit which comprises yieldably securing against relative displacement the strands of a sheet-like fabric having resilient wire strands and providing a friction surface thereon to facilitate handling of said fabric by immersing the latter in a bath comprising a vulcanizable rubber composition, whereby films of said composition are formed across the interstices of said netting, partially setting the deposit of said composition on said fabric by partially vulcanizing the same, bringing said fabric to convoluted contour by reversely bending successive adjacent portions thereof in respectively opposite directions, contacting the rubber composition of the adjacent resulting convolutions, and bringing said rubber composition to a substantially set state by further vulcanization thereof while said convolutions are engaged together.

ROGER K. LEE.
CLARK A. TEA.
HAL C. ANDERSON.